Dec. 19, 1939.          W. EARL          2,184,213
FAN BEARING
Filed Jan. 14, 1939
Fig. 1.
Fig. 2.
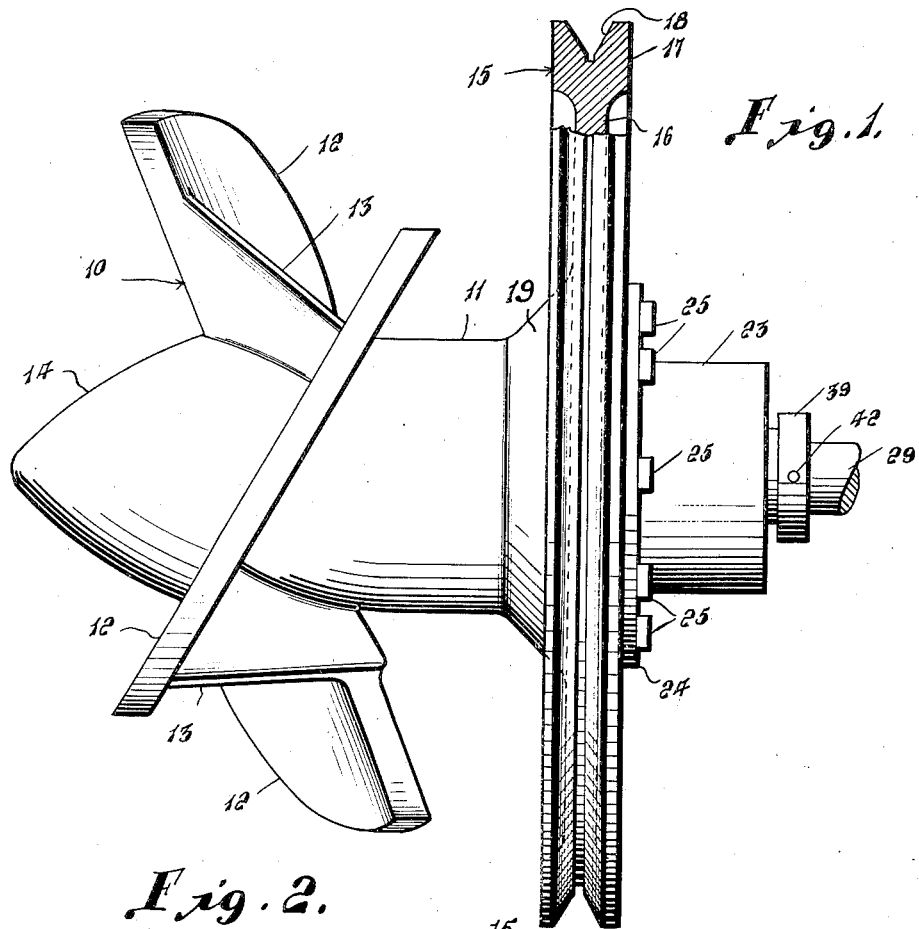
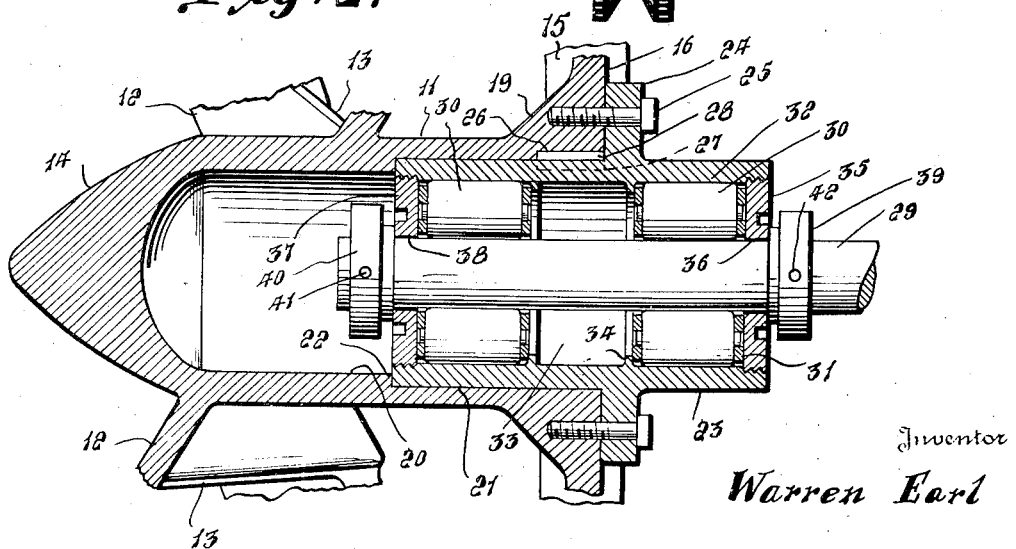
Inventor
Warren Earl
By Kimmel & Crowell
Attorneys Patented Dec. 19, 1939

2,184,213

UNITED STATES PATENT OFFICE 2,184,213

FAN BEARING

Warren Earl, Houston, Tex.

Application January 14, 1939, Serial No. 251,014

3 Claims. (Cl. 308—18)

This invention relates to fan structures and more particularly to an improved bearing for use with a fan structure.

An object of this invention is to provide an improved bearing which is adapted to be fixed to a fan structure and which is adapted to have a stationary shaft mounted therein so as to support the fan for rotation about the shaft.

Another object of this invention is to provide an improved bearing structure which is adapted to have anti-friction bearings mounted therein, the bearings engaging a stationary shaft, which is adapted to support the fan structure.

A further object of this invention is to provide an improved combination including a fan, a pulley secured to the fan, and a bearing which is detachably mounted in the fan structure.

A still further object of this invention is to provide an improved bearing structure for a fan which is so constructed that a lubricant may be maintained within the bearing so that the bearing will be lubricated at all times.

With the foregoing objects and to others which may hereinafter appear, the invention consists of the novel construction, combination and arrangement of parts as will be more specifically referred to and illustrated in the accompanying drawing, wherein is disclosed an embodiment of the invention, but it is to be understood that changes, variations and modifications may be resorted to which fall within the scope of the invention as claimed.

In the drawing:

Figure 1 is a detail side elevation partly broken away and in section of a combined fan, pulley and bearing constructed according to an embodiment of this invention, and Figure 2 is an enlarged fragmentary longitudinal section through the fan and bearing structure.

Referring to the drawing, the numeral 10 designates generally a fan structure comprising a hollow hub 11 and a plurality of fan blades 12. The blades 12 are formed integral with or attached to the hub 11 and in the present instance each pair of blades 12 are connected together by means of the web 13. The forward end of the hub 11 is formed substantially conical in configuration as shown at 14 and the rear end of the hub 11 has secured thereto and preferably formed integral therewith a pulley structure generally designated as 15. The pulley 15 comprises a web or spoke structure 16 and a felly 17 provided with a V-shaped channel or groove 18 in the periphery thereof. The pulley 15 at the point of connection with the hub 11 is provided with an enlargement or annular tapering flange 19 which serves as a bracing means for the pulley 15. The latter is to be operated by a belt, not shown driven by a motor, not shown for the purpose of rotating the fan.

The hub 11 is provided with a bore 20 and a second or counter-bore 21 which terminates between the ends of the hub 11 and forms a shoulder 22 within the hub 11. A cylindrical bearing member 23 is adapted to engage in the counterbore 21 with the forward end of the bearing member 23 abutting against the shoulder 22. The cylindrical member 23 is provided intermediate the ends thereof with an annular flange 24 which is adapted to be secured as by bolts or fastening members 25 to the rear side of the pulley 15. The bolts 25 are adapted to extend into the bracing member 19 as shown in Figure 2.

The hub 11 at its rear end is provided with a keyway 26 and the bearing member 23 is provided with a complementary keyway 27 in which a key 28 is adapted to engage so as to lock the bearing member 23 against rotation relative to the hub 11.

A stationary shaft 29 is disposed axially of the hub 11, being secured at its rear end to a suitable support (not shown) and the forward or outer end of the shaft 29 terminates within the bore 20 of the hub 11. The cylindrical bearing housing 23 has mounted therein a pair of antifriction members 30 which in the present instance are constructed in the form of rollers or ball bearings which are secured to cages 31 and are positioned in bearing chambers 32 provided within the housing 23. A lubricant chamber 33 is provided between the two bearing members 30 and preferably a pair of spaced apart ribs or flanges 34 define the opposite ends of the lubricant chamber 33 and prevent endwise movement of the bearing members 30 toward each other. A nut 35 is threaded into the rear end of the housing member 23 and is provided with an axial opening 36 through which the shaft 29 engages. A second or outer nut 37 is threaded into the outer or forward end of the housing 23 and bears against the foremost cage member 31 so as to prevent endwise movement of the foremost or anti-friction member 30. The nut 37 is provided with a center opening 38 through which the shaft 29 loosely engages. The shaft 29 has a collar 39 fixed thereto which is adapted to abut against the inner or rear nut member 35 and a second collar 40 is fixed by a suitable fastening device such as a pin or key 41 to the shaft 29 and the collar 40 abuts against the nut 37 so that the bearing member 23 is held against endwise movement on the shaft 29, but is permitted free rotation thereupon. The nut member 39 may be secured to the shaft 29 by a fastening member 42 in the form of a pin or key.

In the assemblage of the fan and bearing structure, the lubricant chamber 33 is adapted to be filled with a suitable lubricant in the form of grease after one of the bearing members 30 has been inserted within the housing 23 and the end nut threaded into the end of the housing 23. The opposite end nut may then be threaded into the housing 23 so that the other bearing member 30 will be locked against endwise movement within the bearing housing 23. The bearing housing 23 is then secured by means of the bolts 25 to the pulley 15 and by means of the key 28 secured against rotation relative to the hub 11. The supporting shaft 29 is adapted to be fixed to a suitable support and a belt then trained about the pulley 15. This fan structure is adapted to be mounted in a suitable location such as in an attic or other place where it is desired to form a draft of air and by reason of the self-lubricated bearing, the fan can be operated for a relatively long period of time without requiring the use of additional lubricants or without requiring attention by the users thereof.

What I claim is:

1. A bearing structure for a fan of that type including a hub open at its rear end, a driving means therefor at said end and an internal shoulder, said structure comprising a cylindrical bearing member extending for a portion of its length into the hub, abutting said shoulder and projecting rearwardly from said hub end, said member being formed intermediate the ends of its outer periphery with a flange for abutting said driving means, spaced means for securing said flange to said driving means, axially apertured removable end closures for said member disposed within and connected to the latter, a pair of anti-friction devices arranged in said member, said member having spaced means coacting with said closures for retaining said devices in spaced relation, a stationary shaft extending through said members and closures and encompassed by said devices, a pair of stop collars for arresting the bodily shifting of said member lengthwise of and fixed to said shaft exteriorly of said member, said collars abutting the outer faces of said closures, and means engaging in the outer periphery of said member and adapted to engage in the inner face of the hub for locking said member against rotation relative to the hub.

2. A bearing structure for a fan of that type including a hub open at its rear end, a driving means therefor at said end and an internal shoulder, said structure comprising a cylindrical bearing member extending for a portion of its length into the hub, abutting said shoulder and projecting rearwardly from said hub end, said member being formed intermediate the ends of its outer periphery with a flange for abutting said driving means, spaced means for securing said flange to said driving means, axially apertured removable end closures for said member disposed within and connected to the latter, a pair of anti-friction devices arranged in said member, said member having a portion of its length providing a lubricant chamber between said devices and a pair of internal spaced parallel annular ribs defining the opposite ends of said chamber, said ribs coacting with said closures for retaining said devices in spaced relation and to prevent them shifting lengthwise of said member, a stationary shaft extending through said members and closures and encompassed by said devices, a pair of stop collars for arresting the bodily shifting of said member lengthwise of and fixed to said shaft, said collars abutting the outer faces of closures, and means engaging in the outer periphery of said member and adapted to engage in the inner face of the hub for locking said member against rotation relative to the hub.

3. A bearing structure for a fan of that type including a hub open at its rear end, a driving means therefor at said end and an internal shoulder, said structure comprising a cylindrical bearing member extending for a portion of its length into the hub, abutting said shoulder and projecting rearwardly from said hub end, said member being formed intermediate the ends of its outer periphery with a flange for abutting said driving means, spaced means for securing said flange to said driving means, axially apertured removable end closures for said member disposed within and connected to the latter, a pair of anti-friction devices arranged in said member, said member having spaced means coacting with said closures for retaining said devices in spaced relation, a stationary shaft extending through said members and closures and encompassed by said devices, and means secured to said shaft exteriorly of said member and bearing against the outer faces of said closures to prevent the lengthwise shifting of said member on said shaft.

WARREN EARL.